(12) United States Patent
Hong

(10) Patent No.: US 8,596,195 B2
(45) Date of Patent: Dec. 3, 2013

(54) SLUDGE DEHYDRATING APPARATUS

(75) Inventor: Sang Hun Hong, Gunpo-si (KR)

(73) Assignee: ARK Co. Ltd., Gunpo-si Gyeonggi-do (KR)

( * ) Notice: Subject to any disclaimer, the term of this patent is extended or adjusted under 35 U.S.C. 154(b) by 0 days.

(21) Appl. No.: 13/578,900

(22) PCT Filed: Feb. 22, 2011

(86) PCT No.: PCT/KR2011/001138
§ 371 (c)(1),
(2), (4) Date: Aug. 14, 2012

(87) PCT Pub. No.: WO2011/102691
PCT Pub. Date: Aug. 25, 2011

(65) Prior Publication Data
US 2012/0312177 A1    Dec. 13, 2012

(30) Foreign Application Priority Data

Feb. 22, 2010  (KR) .................. 10-2010-0015621

(51) Int. Cl.
*B30B 9/12*  (2006.01)
*B30B 9/26*  (2006.01)

(52) U.S. Cl.
CPC ...................................... *B30B 9/26* (2013.01)
USPC ......................................................... 100/117

(58) Field of Classification Search
USPC .......... 100/117, 126–129, 145–146; 210/383, 210/385, 413–415
See application file for complete search history.

(56) References Cited

U.S. PATENT DOCUMENTS 3,802,566 A * 4/1974 Hata ............................. 210/174
4,467,717 A * 8/1984 Yamamoto .................... 100/117
7,344,033 B2 * 3/2008 Sasaki .......................... 210/383

FOREIGN PATENT DOCUMENTS

| JP | 61235098 A | * | 10/1986 |
| JP | 61235099 A | * | 10/1986 |
| JP | 2004-249183 A | | 9/2004 |
| KR | 10-2001-0034447 A | | 4/2001 |
| KR | 10-2002-0038426 A | | 5/2002 |
| KR | 10-2002-0038427 A | | 5/2002 |
| KR | 10-2003-0000984 A | | 1/2003 |
| KR | 10-2003-0000985 A | | 1/2003 |
| KR | 10-0578546 B1 | | 5/2006 |
| KR | 2006-0128488 A | | 12/2006 |
| KR | 10-0707283 B1 | | 4/2007 |
| KR | 10-2007-0049875 A | | 5/2007 |

OTHER PUBLICATIONS

Int'l Search Report issued Oct. 28, 2011 in Int'l Application No. PCT/KR2011/001138.

* cited by examiner

*Primary Examiner* — Jimmy T Nguyen
(74) *Attorney, Agent, or Firm* — Panitch Schwarze Belisario & Nadel LLP

(57) ABSTRACT

A sludge dehydrating apparatus (200) according to the present invention is configured such that power is provided at opposite sides of a rotating rod (243) of movable disks (230) so that even if the apparatus is comparatively large or is operated at low speed, the rotating rod of the movable disks (230) can be prevented from being deformed. Thereby, the movable disks (230) can be smoothly rotated at the same time, thus enhancing the efficiency of the dehydration operation. Furthermore, because power is provided on the opposite sides both of the rotating rod (243) of the movable disks (230) and of the drive shaft of a screw (210), even if the screw (210) is comparatively long, the drive shaft of the screw (210) can be preventing from bending, thus preventing malfunction of the apparatus such as deformation of a fixed disk or a movable disk.

13 Claims, 5 Drawing Sheets

SLUDGE DEHYDRATING APPARATUS

CROSS-REFERENCE TO RELATED APPLICATION

This application is a Section 371 of International Application No. PCT/KR2011/001138, filed Feb. 22, 2011, which was published in the Korean language on Aug. 25, 2011, under International Publication No. WO 2011/102691 A2, and the disclosure of which is incorporated herein by reference.

TECHNICAL FIELD

The present invention relates, in general, to sludge dehydrating apparatuses and, more particularly, to a sludge dehydrating apparatus which is configured such that even if the apparatus is comparatively large or is operated at low speed, rotating rods of movable disks can be prevented from being deformed, so that the movable disks can be smoothly reciprocatingly rotated at the same time, thus enhancing the dehydration efficiency.

BACKGROUND ART

The amount of waste water is rapidly increasing every year causing environmental pollution problems to become a major issue. Different kinds of efforts to effectively process waste water are ongoing.

As a representative example of such efforts, techniques used on a sludge dehydrating apparatus which removes water from sludge and makes sludge a cake of dehydrated sludge were proposed in Korean Patent Laid-open Publication No. 2002-0038426, No. 2002-0038427, No. 2003-0000984, No. 2003-0000985, etc.

FIG. 1 is a conceptual view of a conventional sludge dehydrating apparatus disclosed in the above-mentioned techniques. As shown in FIG. 1, in the conventional sludge dehydrating apparatus 100, fixed disks 110 and movable disks 120 are arranged in a row with gaps defined between the plates. A rotating rod 130 connects the movable disks 120 to each other. The movable disks 120 are rotated at the same time by the rotating rod 130 so that water is removed from sludge through the gaps. A screw 140 moves the sludge and compresses it, thus dehydrating the sludge. Here, the movable disks 120 use the power of a drive source 150 of the screw 140 to rotate.

However, in the conventional sludge dehydrating apparatus 100, the drive source 150 that drives the screw 140 is provided on only one side of the screw 140. In addition, the drive source 150 not only rotates the screw 140 but also rotates the movable disks 120 around the screw 140. Therefore, the torsion stress that is applied to a start point of the rotating rod 130 at which the power of the drive source 150 is applied to the rotating rod 130 differs from that applied to an end point of the rotating rod 130 which is the final recipient of the power.

If the sludge dehydrating apparatus 100 is small, in other words, is comparatively short, the possibility of the rotating rod 130 undergoing bending deflection is low. Thus, the movable disks 120 can be rotated at the same time without causing any problems so that the dehydrating operation can be carried out smoothly.

However, if the sludge dehydrating apparatus 100 is large and thus comparatively long, the rotating rod 130 may bend, thus making it difficult to smoothly dehydrate sludge. In detail, with the passage of time, the rotating rod 130 that was up to that point straight may bend at its portion that is far from the drive source 150. Hence, as distance from the drive source 150 increases, the efficiency of power transmission is reduced. As a result, the movable disks 120 that are positioned far from the drive source 150 cannot rotate normally resulting in the gaps possibly not being reliably defined between the plates, thus making the dehydration of sludge inefficient.

Furthermore, if the sludge dehydrating apparatus 100 is comparatively long and thus the screw 140 is also long, the drive shaft of the screw 140 may bend. Thereby, malfunction of the apparatus such as deformation of the fixed disks 110 and the movable disks 120 may result.

In the operation of the sludge dehydrating apparatus 100 which dehydrates sludge, if the screw 140 is rotated at low speed in order to enhance the efficiency of dehydration, a large load is applied not only to the screw 140 but also to the rotating rod 130, thus causing bending deflection of the rotating rod 130 that results in the above-stated problems.

DISCLOSURE

Technical Problem

Accordingly, the present invention has been made keeping in mind the above problems occurring in the prior art, and an object of the present invention is to provide a sludge dehydrating apparatus which is configured such that power is provided at opposite sides of a rotating rod of movable disks so that even if the apparatus is comparatively large or is operated at low speed, the rotating rod of the movable disks can be prevented from being deformed, whereby the movable disks can be smoothly rotated at the same time, thus enhancing the efficiency of the dehydration operation.

Another object of the present invention is to provide a sludge dehydrating apparatus in which power is provided on the opposite sides both of the rotating rod of the movable disks and of the drive shaft of the screw so that even if the screw is comparatively long, the drive shaft of the screw can be preventing from bending, thus preventing malfunction of the apparatus such as deformation of a fixed disk or a movable disk.

A further object of the present invention is to provide a sludge dehydrating apparatus in which a drive source that rotates the screw is separately provided from a drive source that reciprocating-rotates the rotating rod of the movable disks, whereby the number of rotations of the screw and the number of reciprocating-rotation of the rotating rod can be easily adjusted, thus making it easy to control the amount of sludge that is processed and the percentage of water content in a cake of dehydrated sludge.

Technical Solution

In order to accomplish the above objects, the present invention provides a sludge dehydrating apparatus, including: a cylinder formed by alternately placing fixed disks and movable disks one after another with gaps defined between the plates, with at least two protrusions provided on a circumferential outer edge of each of the fixed disks and movable disks; compression means provided along a center axis of the cylinder, the compression unit receiving power from a drive source and moving and compressing sludge so that water is removed from the sludge through the gaps; a plurality of rotating rods inserted into insert holes formed in the protrusions of the movable disk so that the movable disks are connected to each other in a longitudinal direction of the cylinder by the rotating rods; and a pair of rotation guide units provided on respective opposite ends of the rotating rods, the pair of rotation guide units receiving power from a drive source and rotating the rotating rods at a same time so that the movable disks are reciprocating-rotated with respect to the fixed disks, wherein the drive source of the rotation guide units comprises a pair of motors provided on respective first sides of the rotation guide units, the pair of motors providing power to the pair of rotation guide units at a same time so that the movable disks are reciprocating-rotated with respect to the fixed disks by the rotating rods.

The compression means may comprise a screw rotating around an axis along which the fixed disks and the movable disks are arranged.

Furthermore, opposite ends of a drive shaft of the screw may be coupled to respective second sides of the rotation guide units so that the pair of motors comprise the drive source of the screw.

The drive source of the screw comprises another motor provided on one end or each of opposite ends of the drive shaft of the screw.

Each of the pair of rotation guide units may include: a driven plate coupled to corresponding ends of the rotating rods, with a plurality of guide holes formed in the driven plate; a plurality of rotating cams disposed in the respective guide holes; and a drive unit rotating the rotating cams.

The drive unit may include power transmitting means for the power of the drive source of the screw or the rotation guide units to the rotating cams.

The power transmitting means may include a combination of a plurality of gears to drive the rotating cams.

Advantageous Effects

In a sludge dehydrating apparatus according to the present invention, power is provided on opposite sides of a rotating rod of movable disks so that even if the apparatus is comparatively large or is operated at low speed, the rotating rod of the movable disks can be prevented from being deformed. Thereby the movable disks can smoothly rotate at the same time, thus enhancing the efficiency of the dehydration operation.

Furthermore, because power is provided on the opposite sides both of the rotating rod of the movable disks and of the drive shaft of the screw, even if the screw is comparatively long, the drive shaft of the screw can be prevented from bending, thus preventing malfunction of the apparatus such as deformation of a fixed disk or a movable disk.

Moreover, a drive source that rotates the screw is separately provided from a drive source that reciprocating-rotates the rotating rod of the movable disks. Hence, the number of rotations of the screw and the number of reciprocating-rotation of the rotating rod can be easily adjusted, thus making it easy to control the amount of sludge that is processed and the percentage of water content in a cake of dehydrated sludge.

BEST MODE

Hereinafter, preferred embodiments of a sludge dehydrating apparatus according to the present invention will be described in detail with reference to the attached drawings.

Figure 1:
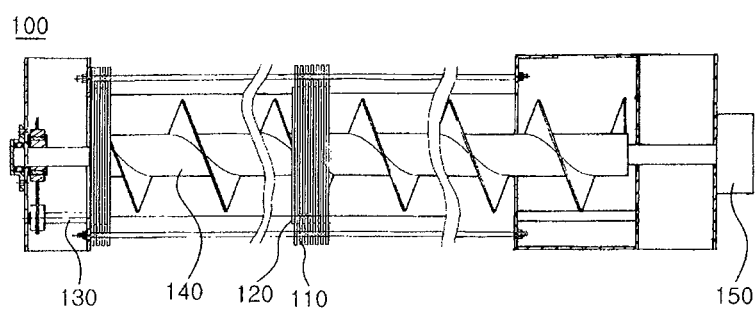
FIG. 1 is a conceptual view of a conventional sludge dehydrating apparatus.
Figure 2:
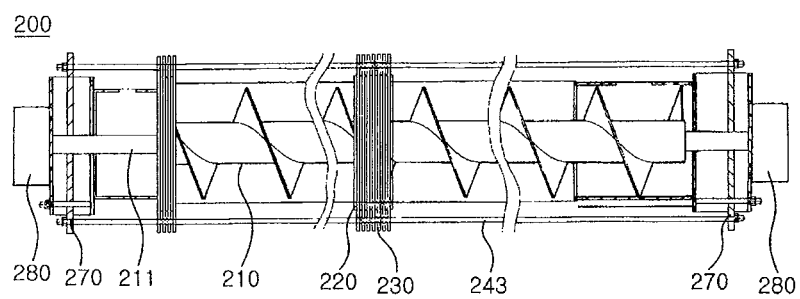
FIG. 2 is a conceptual view of a sludge dehydrating apparatus, according to an embodiment of the present invention.
Figure 3:
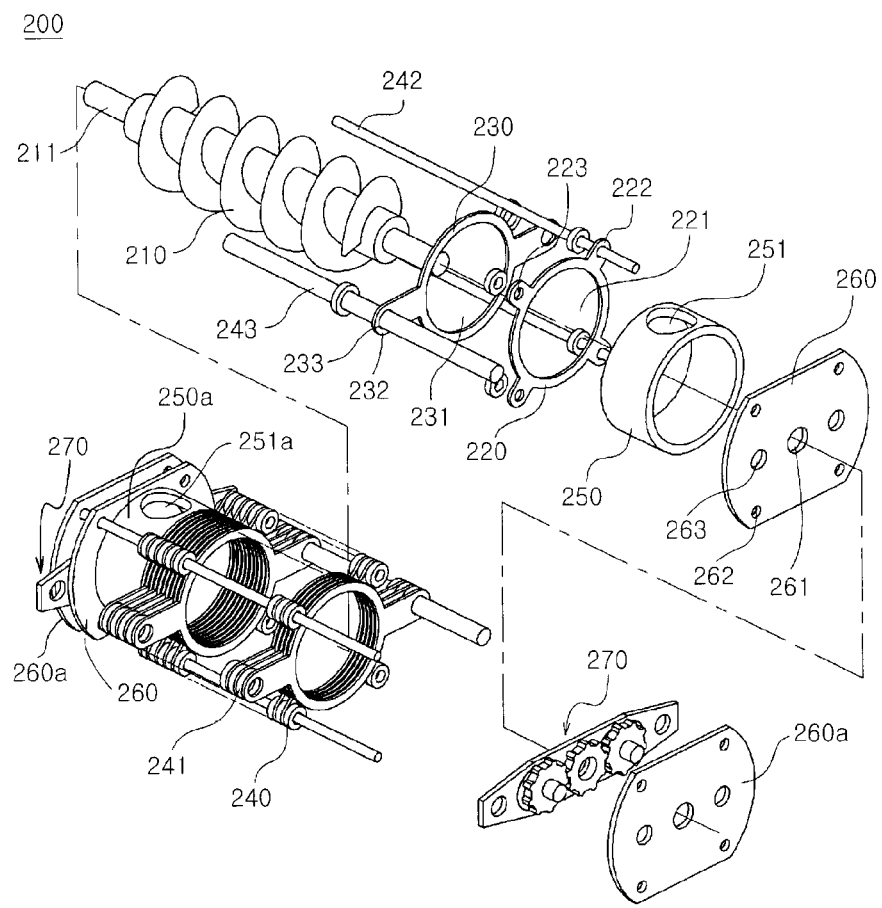
FIG. 3 is a partial exploded perspective view illustrating the construction of the sludge dehydrating apparatus of FIG. 2.
Figure 4:
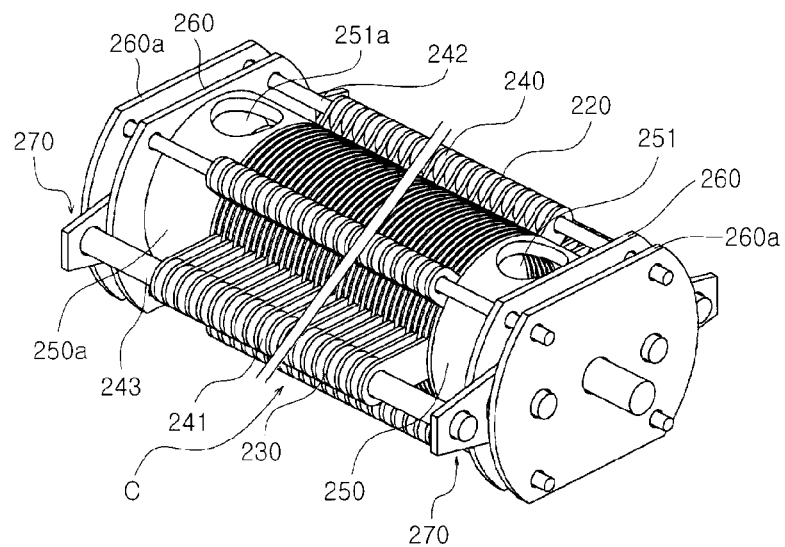
FIG. 4 is a perspective view of the assembled sludge dehydrating apparatus of FIG. 3.
Figure 5:
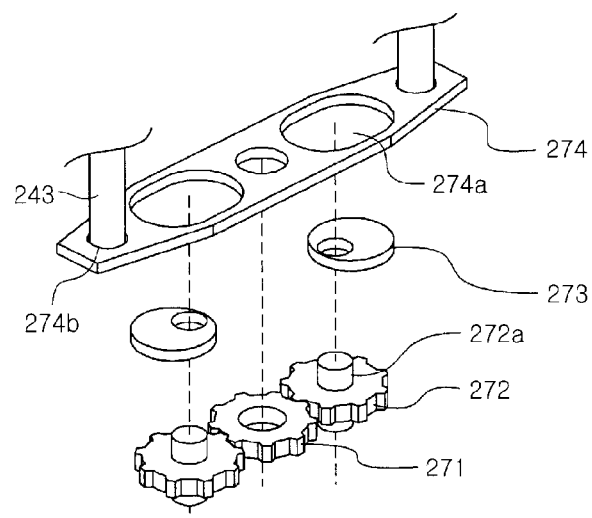
FIG. 5 is a perspective view illustrating in detail a rotation guide unit of the sludge dehydrating apparatus of FIG. 3.
Figure 6:
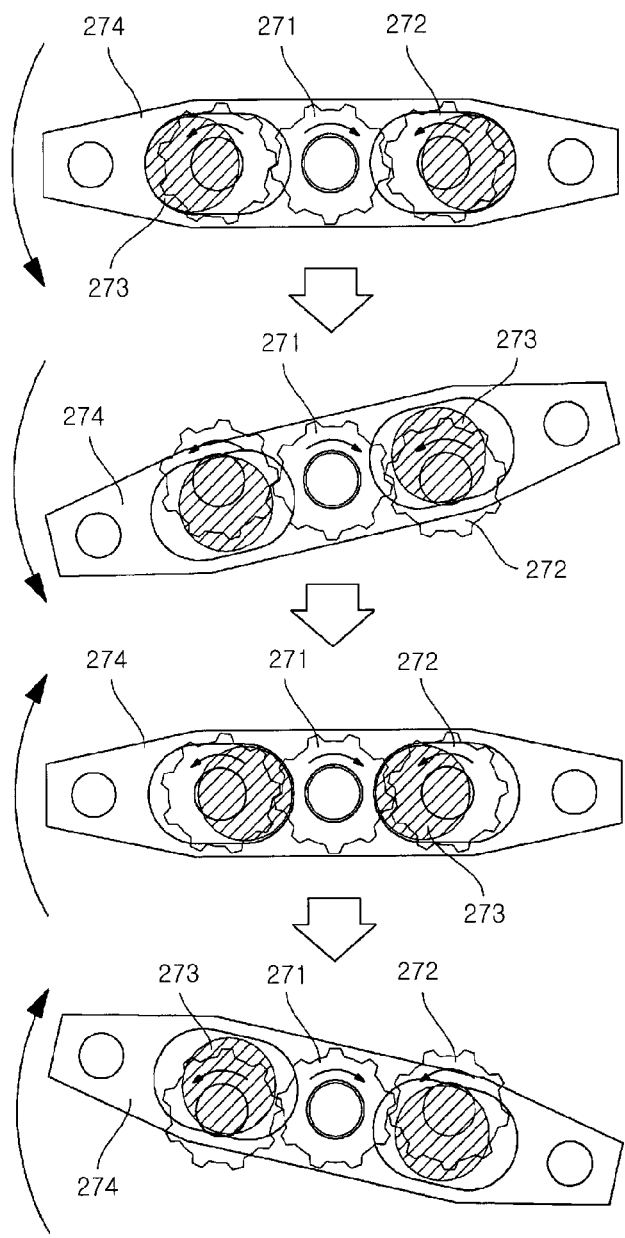
FIG. 6 is of views showing the operation of the rotation guide unit of FIG. 5.

FIG. 2 is a conceptual view of a sludge dehydrating apparatus, according to an embodiment of the present invention. FIG. 3 is a partial exploded perspective view illustrating the construction of the sludge dehydrating apparatus of FIG. 2. FIG. 4 is a perspective view of the assembled sludge dehydrating apparatus of FIG. 3. FIG. 5 is a perspective view illustrating in detail a rotation guide unit of the sludge dehydrating apparatus of FIG. 3. FIG. 6 is of views showing the operation of the rotation guide unit of FIG. 5.

As shown in FIGS. 2 through 4, the sludge dehydrating apparatus 200 according to this embodiment of the present invention dehydrates sludge and makes a cake of dehydrated sludge. The sludge dehydrating apparatus 200 includes: a cylinder C which is formed by alternately placing fixed disks 220 and movable disks 230 one after another with gaps defined between the plates; a screw 210 which is installed along a center axis of the cylinder C and moves and compresses sludge to dehydrate it; a rotation guide unit 270 which receives power from the screw 210 and rotates the movable disks 230 with respect to the fixed disks 220; and a pair of motors 280 which function as a drive source and are respectively provided on opposite ends of the screw 210 to provide power for driving the screw 210 at the same time.

Each of the fixed disks 220 and the movable disks 230 is an annular member that has a predetermined thickness. Through holes 221 and 231 are respectively formed in each fixed disk 220 and each movable disk 230. The through holes 221 and 231 have the same diameter. Two pairs of protrusions 222 protrude outwards from a circumferential outer edge of each fixed disk 220. A pair of protrusions 232 protrude outwards from a circumferential outer edge of each movable disk 230. Insert holes 223 and 233 are respectively formed in the protrusions 222 and 232.

As shown in FIG. 4, the fixed disks 220 and the movable disks 230 are alternately placed one after another, thus forming the single cylinder C. The protrusions 222 of the fixed disks 220 are aligned with each other in the longitudinal direction of the cylinder C, and the protrusions 232 of the movable disks 230 are also aligned with each other in the longitudinal direction of the cylinder C. Here, the protrusions 222 of the fixed disks 220 do not overlap with the protrusions 232 of the movable disk 230. On the other hand, the through holes 221 of the fixed disks 220 and the through holes 231 of the movable disks 230 have the same diameter and form a single contiguous space. This space serves as a path along which sludge moves.

In this embodiment, each fixed disk 220 has the four protrusions 222. The protrusions 222 are symmetric with respect to the center of the through hole 221 of the fixed disk 220. Although each fixed disk 220 of this embodiment has been illustrated as including the four protrusions 222, the number of protrusions 222 may be changed as necessary.

Four fixed rods 242 which are oriented parallel to the longitudinal direction of the cylinder C are coupled to the corresponding insert holes 223 of the protrusions 222 and integrally connect the fixed disks 220 to each other. The purpose of the fixed rods 242 is to firmly support the fixed disks 220 so that they can be prevented from moving not only in the longitudinal direction of the cylinder C but also in the circumferential direction of the fixed disks 220. Spacers 240 are provided on each of the fixed rods 242 between the fixed disks 220 that are stacked in the longitudinal direction so that a distance between every two fixed disks 220 can be maintained constant. Each spacer 240 is thicker than the movable disk 230. Therefore, gaps are defined between the fixed disks 220 and the movable disks 230.

In this embodiment, the protrusions 232 of the movable disks 230 are disposed between the protrusions 222 of the fixed disks 220. The reason for this is to reduce interference of the protrusions 232 of the movable disks 230 with the protrusions 222 of the fixed disks 220 when the movable disks 230 rotate, thus increasing a range within which the movable disks 230 can rotate.

Two rotating rods 243 are inserted into the corresponding insert holes 233 of the movable disks 230 in the longitudinal direction of the cylinder C and integrally connect the movable disks 230 to each other. The rotating rods 243 function to integrally move the movable disks 230. Spacers 241 are provided on each rotating rod 243 between the movable disks 230 so that the distance between the movable disks 230 can be maintained constant.

Each spacer 241 is thicker than the fixed disk 220. Therefore, gaps are formed between the fixed disks 220 and the movable disks 230 by the differing thicknesses of the spacers 240 and 241, the fixed disks 220 and the movable disks 230. The gaps function as outlet holes through which water that has been contained in sludge is discharged out of the cylinder C.

Connection pipes 250 and 250a are respectively provided on the opposite ends of the cylinder C. The inner diameter of each connection pipe 250, 250a is the same as that of the through holes 221 and 231. Opposite ends of each connection pipe 250, 250a are open so that substances can move through it in the longitudinal direction. Openings 251 and 251a are respectively formed in circumferential surfaces of the connection pipes 250 and 250a. Each opening 251, 251a functions as a passage through which sludge is supplied into the cylinder or a cake of dehydrated sludge is discharged out of cylinder. Because the connection pipes 250 and 250a must always be fixed, they must be coupled to the fixed disks 220 which do not rotate. Therefore, the cylinder C must be configured such that the fixed disk 220 is disposed on each of the opposite ends of the cylinder C.

The screw 210 is installed in the cylinder C. The screw 210 includes a drive shaft 211 which is parallel to the longitudinal direction of the cylinder C. The screw 210 is disposed through both the cylinder C and the connection pipes 250 and 250a. The screw 210 rotates around the drive shaft 211 and transfers sludge, which is drawn into the inlet opening 251 of the connection pipe 250 which is provided on a first end of the cylinder C, to the other connection pipe 250a which is provided on a second end of the cylinder C. Simultaneously, the screw 210 functions as a compression means which compresses sludge with respect to the longitudinal direction of the cylinder C. Here, the two motors 280 which are disposed on opposite sides of the screw 210 provide drive force to the screw 210 at the same time to rotate the screw 210 around the drive shaft 211.

A reinforcing plate 260 is coupled to each end of the extremities of the connection pipes 250 and 250a. First, second and third coupling holes 261, 262 and 263 are formed in the reinforcing plate 260. The drive shaft 211 of the screw 210, the fixed rods 242 and the rotating rods 243 are respectively coupled to the first, second and third coupling holes 261, 262 and 263. The drive shaft 211 is rotatably coupled to the first coupling holes 261 by bearings (not shown). The fixed rods 242 are fixed to the second coupling holes 262. The rotating rods 243 are rotatably coupled to the third coupling holes 263. Therefore, the fixed disks 220 which are integrally connected to each other by the fixed rods 242 can be reliably fixed.

The rotation guide unit 270 is provided on an outer surface of each reinforcing plate 260 and functions to rotate the rotating rods 243. The rotation guide unit 270 is configured such that rotation of the screw 210 is converted into reciprocating-rotation of the rotating rods 243.

The construction of the rotation guide unit 270 according to this embodiment will be explained.

As shown in FIG. 5, the rotation guide unit 270 includes a drive gear 271, driven gears 272, rotating cams 273 and a driven plate 274.

The drive gear 271 is coupled to the drive shaft 211 of the screw 210 and rotated along with the screw 210 around the drive shaft 211. Driven shafts 272a which are parallel to the drive shaft 211 are respectively provided on left and right sides of the drive shaft 211. The driven gears 272 are provided on the respective driven shafts 272a and engage with the drive gear 271.

The rotating cams 273 are coupled to corresponding surfaces of the respective driven gears 272. Each rotating cam 273 is eccentrically provided on the corresponding driven gear 272. When each driven gear 272 rotates, the corresponding rotating cam 273 rotates around the driven shaft 272a of the driven gear 272. That is, the rotating cams 273 receive power from a drive unit that includes the drive shaft 211 of the screw 210, the drive gear 271 and the driven gears 272. The drive unit transfers the rotation of the screw 210 to the rotating cams 273 using a power transmitting means that includes a gear combination of the drive gear 271 and the driven gears 272.

The driven plate 274 is rotatably provided on the drive shaft 211. Guide holes 274a and insert holes 274b are formed through the driven plate 274 in the longitudinal direction of the cylinder C. The rotating cams 273 are disposed in the corresponding guide holes 274a. The rotating rods 243 are coupled to the corresponding insert holes 274b.

Each guide hole 274a is an elongated hole formed in the drive plate 274. A width of the guide hole 274a is the same as the diameter of the rotating cam 273. A length of the guide hole 274a is equal to or greater than a diameter of rotation of the rotating cam 273. Therefore, the rotating cam 273 moves with respect to the guide hole 274a in a longitudinal direction of the guide hole 274a. That is, when the driven gears 272 rotate around the corresponding driven shafts 272a, the rotating cams 273 push sidewalls of the guide holes 274a, thus rotating the driven plate 274, and move in the longitudinal directions of the guide holes 274a. Meanwhile, because the rotating rods 243 are coupled to the driven plate 274, when the driven plate 274 rotates, the movable disks 230 are rotated by the rotating rods 243 in the same direction that the driven plate 274 is moving in.

In this embodiment, an auxiliary reinforcing plate 260a is further coupled to an outer side of the rotation guide unit 270. The auxiliary reinforcing plate 260a functions to protect the rotation guide unit 270 from an external impact and support the shafts and rods.

Below the operation of the rotation guide unit 270 will be explained in detail.

As shown in FIG. 6, when the drive gear 271 rotates, the driven gears 272 rotate in directions opposite to the direction in which the drive gear 271 rotates.

Then, the rotating cams 273 which are coupled to the driven gears 272 rotate around the corresponding driven shafts 272a along different circular trajectories. Because the rotating cams 273 are disposed in the guide holes 274a of the driven plate 274, the rotating cams 273 that are rotating push the sidewalls of the guide holes 274a and move along the longitudinal directions of the guide holes 274a. As a result, the driven plate 274 reciprocating-rotates within a range in which the rotation trajectories of the rotating cams 273 overlap the trajectory along which the guide holes 274a rotate around the drive shaft 211.

An angle at which the driven plate 274 rotates reaches a peak when the rotating cams 273 are positioned at medial portions of the guide holes 274a. After it passes over the peak, the driven plate 274 are rotated in the reverse direction again by the rotation of the rotating cams 273, so that the angle is reduced. Upon the rotating cams 273 reaching the ends of the guide holes 274a, the angle hits its lowest point. As such, while the rotating cams 273 are rotating, the driven plate 274 reciprocating-rotates within a predetermined range. Therefore, in this present invention, if the screw 210 rotates, the movable disks 230 are reciprocating-rotated by the rotating cams 273 and the driven plates 274, thus causing friction so that substances that have become caught between the fixed disks 220 and the movable disks 230 can be removed. The angle within which the driven plate 274 rotates can be controlled by adjusting the diameters of rotation of the rotating cams 273.

The two motors 280 are respectively installed on the opposite ends of the drive shaft 211 of the screw 210. The motors 280 provide power to the drive shaft 211 at the same time, thus rotating the screw 210. In addition, the motors 280 reciprocating-rotates the movable disk 230 both using the rotation guide units 270 that are coupled to the drive shaft 211 and using the rotating rods 243.

As illustrated in this embodiment, if the two motors 280 are respectively provided on the opposite ends of the drive shaft 211, an inverter is required to synchronize the rotational speeds of the motors 280. However, in the test working of a prototype apparatus manufactured by the inventor of the present invention, it could be confirmed that the rotational speed of one of the motors to which a load was applied and the rotational speed of the other motor to which no load was applied are autonomously synchronized with each other. Therefore, in the sludge dehydrating apparatus 200 of this embodiment, if one electronic signal (Hertz signal) is applied to the motors 280, the screw 210 and the movable disks 230 can be operated in the above-described manner.

Furthermore, as described in this embodiment, if the two motors 280 are respectively provided on the opposite ends of the drive shaft 211 so that they provide power to the drive shaft 211 at the same time, the same torsion stress is applied to the opposite ends of the rotating rods 243. As a result, there is no possibility of bending deflection of the rotating rods 243. In other words, even if the sludge dehydrating apparatus 200 is large, especially, long, or it is operated at low speed to enhance the dehydration efficiency, the rotating rods 243 can be reliably prevented from being deformed. Therefore, the movable disks 230 can be smoothly reciprocating-rotated by the rotating rods 243 so that sludge can be efficiently dehydrated.

Moreover, because the two motors 280 provide power to the drive shaft 211 on the opposite sides of the drive shaft 211 at the same time, even if the screw 210 is comparatively long, there is no possibility of bending deflection of the drive shaft 211 of the screw 210. The present invention can therefore reliably prevent failure of the apparatus such as deformation of the fixed disks 220 or the movable disks 230 which may be caused by the bending deflection of the drive shaft 211.

Hereinafter, the overall operation of the sludge dehydrating apparatus according to the embodiment of the present invention will be described in detail.

Figure 7:
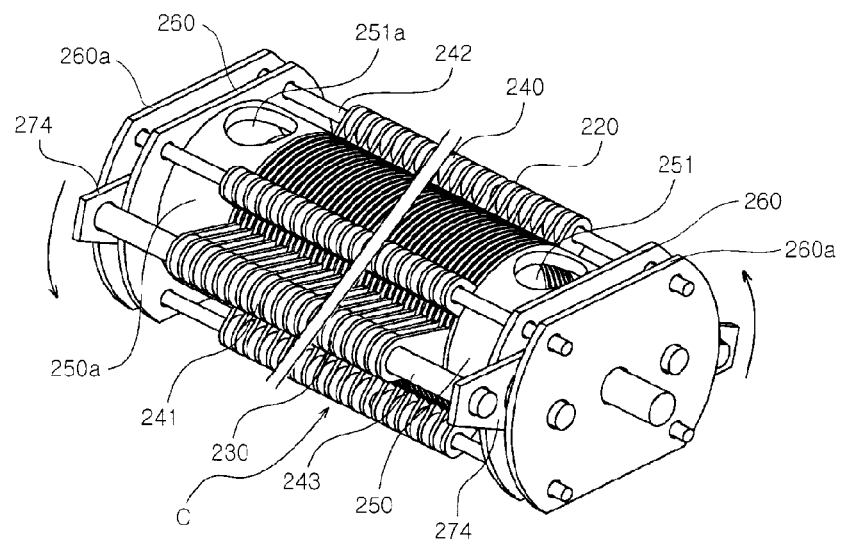
FIG. 7 is a view showing the operation of the sludge dehydrating apparatus of FIG. 4.

FIG. 7 is a view showing the operation of the sludge dehydrating apparatus of FIG. 4. As shown in FIGS. 2 through 7, sludge is input into the inlet opening 251 of the connection pipe 250 that is coupled to the first end of the cylinder C. Thereafter, the screw 210 is operated so that the sludge that has been input into the cylinder C is moved to the second end of the cylinder C. Thereby, water that has been contained in the sludge moves along the sludge and gradually come out of the cylinder C through the gaps between the fixed disks 220 and the movable disks 230 due to the force of gravity.

Furthermore, as shown in FIG. 6, the driven plates 274 reciprocating-rotate around the longitudinal axis of the cylinder C. Then, the movable disks 230 are reciprocating-rotated along with the driven plates 274 by the rotating rods 243 coupled to the driven plates 274. The fixed disks 220 do not rotate because they are fixed to the fixed rods 242 coupled to the reinforcing plates 250.

The reciprocating-rotation of the movable disks 230 induces continuous motion of the interior of the cylinder C, thus stimulating the sludge so that water can be smoothly removed from the sludge, and preventing substances from clogging the gaps between the fixed disks 220 and the movable disks 230. Therefore, the present invention can effectively dehydrate sludge. Meanwhile, a cake of dehydrated sludge that has been transferred to the second end of the cylinder C by the screw 210 is discharged out of the cylinder C through the outlet opening 251a of the connection pipe 250a coupled to the second end of the cylinder C.

Mode for Invention

Figure 8:
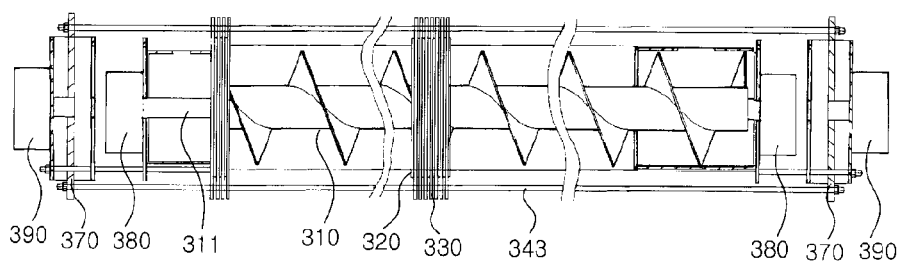
FIG. 8 is a conceptual view of a sludge dehydrating apparatus, according to another embodiment of the present invention.

FIG. 8 is a conceptual view of a sludge dehydrating apparatus, according to another embodiment of the present invention. As shown in FIG. 8, the general construction of the sludge dehydrating apparatus 300 according to this embodiment of the present invention, other than the structure in which a drive source for rotating a screw 310 is separately provided from a drive source for reciprocating-rotating movable disks 330, is the same as that of the sludge dehydrating apparatus 200 described above. Hence, the description below of the sludge dehydrating apparatus 300 of this embodiment will focus on the differences between it and the sludge dehydrating apparatus 200.

The sludge dehydrating apparatus 300 according to this embodiment includes a first motor 380 and a pair of second motors 390. The first motor 380 rotates the screw 310. The second motors 390 rotate rotating rods 343 which connect movable disks 330 to each other, thus reciprocating-rotating the movable disks 330. The first motor 380 may be provided on only one end of a drive shaft 311 of the screw 310. Alternatively, the first motor 380 may be provided on each of the opposite ends of the drive shaft 311. If the first motors 380 are respectively provided on the opposite ends of the drive shaft 311, even though the screw 310 is comparatively long, there is no possibility of bending deflection of the drive shaft 311 of the screw 310, as stated above, thus preventing failure of the apparatus such as deformation of fixed disks 320 or the movable disks 330 which may be caused by bending deflection of the drive shaft 311.

The two second motors 390 provide power to the rotating rods 343 on opposite sides of them at the same time. To provide power to the rotating rods 343, a drive shaft (not shown) is provided on each drive gear 271 of FIG. 5, and a first end of the drive shaft of the drive gear 271 is coupled to a rotation guide unit 370 which is rotatably provided on the driven plate 274. The second motors 390 are respectively coupled to second ends of the drive shafts of the drive gears 271 and provide power thereto so that the movable disks 330 are reciprocating rotated by means of the rotating rods 343.

In the sludge dehydrating apparatus 300 of this embodiment, the two motors 390 provide power to the opposite sides of the rotating rods 343 at the same time, thus achieving the same effect as that of the sludge dehydrating apparatus 200 described above.

Furthermore, in the sludge dehydrating apparatus 300 of this embodiment, the drive source that rotates the screw 310 is separately provided from the drive source that reciprocating-rotates the movable disks 330. Thus, regardless of a rotation ratio of the screw 310, the rotating rods 343 can be operated at the desired number of rotations. Therefore, gaps between the fixed disks 320 and the movable disks 330 can be more effectively used, thereby further enhancing the dehydration efficiency of the apparatus. Moreover, given an amount of sludge to be processed and the percentage of water content in a cake of dehydrated sludge, the rotational speed of the screw 310 and the reciprocating-rotational speed of the rotating rods 343 can be adjusted.

Although the sludge dehydrating apparatus according to the present invention has been disclosed with reference to the drawings, this is provided to illustrate only preferred embodiments of the present invention and does not limit the present invention.

Furthermore, those skilled in the art will appreciate that various modifications, additions and substitutions are possible, without departing from the scope and spirit of the invention as disclosed in the accompanying claims.

Industrial Applicability

As described above, in the present invention, power is provided at opposite sides of rotating rods of movable disks so that the rotating rods can be prevented from being deformed. Therefore, a sludge dehydrating apparatus can be manufactured on a large scale.

The invention claimed is:

1. A sludge dehydrating apparatus, comprising:
a cylinder formed by alternately placing fixed disks and movable disks one after another with gaps defined between the plates, with at least two protrusions provided on a circumferential outer edge of each of the fixed disks and movable disks;
compression means provided along a center axis of the cylinder, the compression unit receiving power from a drive source and moving and compressing sludge so that water is removed from the sludge through the gaps;
a plurality of rotating rods inserted into insert holes formed in the protrusions of the movable disk so that the movable disks are connected to each other in a longitudinal direction of the cylinder by the rotating rods; and
a pair of rotation guide units provided on respective opposite ends of the rotating rods, the pair of rotation guide units receiving power from a drive source and rotating the rotating rods at a same time so that the movable disks are reciprocating-rotated with respect to the fixed disks,
wherein the drive source of the rotation guide units comprises a pair of motors provided on respective first sides of the rotation guide units, the pair of motors providing power to the pair of rotation guide units at a same time so that the movable disks are reciprocating-rotated with respect to the fixed disks by the rotating rods.

2. The sludge dehydrating apparatus according to claim 1, wherein the compression means comprises a screw rotating around an axis along which the fixed disks and the movable disks are arranged.

3. The sludge dehydrating apparatus according to claim 2, wherein opposite ends of a drive shaft of the screw are coupled to respective second sides of the rotation guide units so that the pair of motors comprise the drive source of the screw.

4. The sludge dehydrating apparatus according to claim 2, wherein the drive source of the screw comprises another motor provided on one end or each of opposite ends of the drive shaft of the screw.

5. The sludge dehydrating apparatus according to claim 2, wherein each of the pair of rotation guide units comprises: a driven plate coupled to corresponding ends of the rotating rods, with a plurality of guide holes formed in the driven plate; a plurality of rotating cams disposed in the respective guide holes; and a drive unit rotating the rotating cams.

6. The sludge dehydrating apparatus according to claim 5, wherein the drive unit comprises power transmitting means for the power of the drive source of the screw or the rotation guide units to the rotating cams.

7. The sludge dehydrating apparatus according to claim 6, wherein the power transmitting means comprises a combination of a plurality of gears to drive the rotating cams.

8. The sludge dehydrating apparatus according to claim 3, wherein each of the pair of rotation guide units comprises: a driven plate coupled to corresponding ends of the rotating rods, with a plurality of guide holes formed in the driven plate; a plurality of rotating cams disposed in the respective guide holes; and a drive unit rotating the rotating cams.

9. The sludge dehydrating apparatus according to claim 8, wherein the drive unit comprises power transmitting means for the power of the drive source of the screw or the rotation guide units to the rotating cams.

10. The sludge dehydrating apparatus according to claim 9, wherein the power transmitting means comprises a combination of a plurality of gears to drive the rotating cams.

11. The sludge dehydrating apparatus according to claim 4, wherein each of the pair of rotation guide units comprises: a driven plate coupled to corresponding ends of the rotating rods, with a plurality of guide holes formed in the driven plate; a plurality of rotating cams disposed in the respective guide holes; and a drive unit rotating the rotating cams.

12. The sludge dehydrating apparatus according to claim 11, wherein the drive unit comprises power transmitting means for the power of the drive source of the screw or the rotation guide units to the rotating cams.

13. The sludge dehydrating apparatus according to claim 12, wherein the power transmitting means comprises a combination of a plurality of gears to drive the rotating cams.

* * * * *